United States Patent Office 3,350,427
Patented Oct. 31, 1967

3,350,427
PROCESS FOR THE DEHYDROHALOGENATION OF STEROIDS
William H. Gebert, Morris Plains, and Nathaniel Murrill, Orange, N.J., assignors to Schering Corporation, Bloomfield, N.J., a corporation of New Jersey
No Drawing. Filed Jan. 28, 1966, Ser. No. 523,573
10 Claims. (Cl. 260—397.4)

This invention relates to a novel improved process for dehydrohalogenating organic compounds.

In general, the invention sought to be patented is described as residing in the concept of treating an α-bromoketone having a hydrogen on the beta carbon with a dehydrohalogenating agent selected from the group consisting of an alkaline earth oxide, an alkaline earth hydroxide, and mixtures thereof in a solvent selected from the group consisting of an N,N-dilower alkyl amide of a hydrocarbon carboxylic acid having up to 18 carbon atoms and an N-lower alkyl-2-pyrrolidone whereby dehydrobromination occurs and there is formed an α,β-unsaturated ketone.

More specifically, the invention sought to be patented is described as residing in the concept of treating an α-bromo-keto steroid having a hydrogen on the carbon atom positioned beta to the keto group, with a dehydrobrominating agent selected from the group consisting of an alkaline earth oxide, an alkaline earth hydroxide, and mixtures thereof in a solvent selected from the group consisting of an N,N-dilower alkyl amide of a hydrocarbon carboxylic acid having up to 18 carbon atoms and an N-lower alkyl 2-pyrrolidone whereby dehydrobromination occurs and there is formed an α(β)-unsaturated keto-steroid.

Included within the dehydrohalogenating agents contemplated by this invention are alkaline earth oxides such as magnesium oxide, strontium oxide, barium oxide, and calcium oxide; alkaline earth hydroxides, such as magnesium hydroxide, strontium hydroxide, barium hydroxide, and calcium hydroxide; and mixtures of the foregoing, in particular, a mixture of magnesium oxide and magnesium hydroxide, said mixture preferably containing about 70% magnesium oxide and about 30% magnesium hydroxide (by weight). The aforementioned alkaline earth oxides and/or hydroxides may be used alone or, if it is desired to increase the speed of the dehydrohalogenation, they may be used together with a lithium halide, e.g., lithium bromide.

The approximately 70/30 weight mixture of magnesium oxide and magnesium hydroxide is a preferred dehydrohalogenating agent of this invention. This reagent mixture may be prepared by mixing weighed portions of magnesium oxide and magnesium hydroxide. Alternatively, this reagent mixture is contained in a readily available commercial product called Sea Sorb (registered trademark of FMC Corporation, New York City), one form of which, Sea Sorb 53, is particularly effective when used in our process.

Included within the N,N-disubstituted amides useful as solvents in our process are N,N-dilower alkyl amides of hydrocarbon carboxylic acids having up to 18 carbon atoms such as N,N - dimethylformamide, N,N - diethylformamide, N,N - dimethylacetamide, N,N - dimethylcaproamide, N,N - dimethylcaprylamide, N,N - dimethylcapramide, N,N - dimethyllauramide, N,N - dimethylmyristamide, N,N - dimethylpalmitamide, N,N - dimethylstearamide, and N,N-dimethyloleamide, as well as N-lower alkyl substituted cyclic amides such as N-methyl-2-pyrrolidone and N-ethyl 2-pyrrolidone. Preferred solvents for use in the process of this invention are N,N-dimethylacetamide and, in particular, N,N-dimethylformamide.

By lower alkyl is contemplated hydrocarbon radicals having preferably up to four carbon atoms including methyl, ethyl, n-propyl, iso-propyl, n-butyl, iso-butyl, and tertiary butyl.

Our process is particularly valuable when it is desired to dehydrobrominate a 17-bromo-20-keto-steroid having at least one hydrogen at C–16, e.g. 16α - methyl - 17α-bromo-5-pregnen-3β-ol-20-one or the 3-acetate thereof to the corresponding 16-dehydro-20-keto-steroid, e.g. 5,16-pregnadien-3β-ol-20-one or the 3-acetate thereof, which are known, valuable intermediates in the preparation of other known therapeutically valuable compounds. For example, 16-methyl - 5,16 - pregnadien-3β-ol-20-one may be catalytically hydrogenated to provide 16β-methyl-5-pregnen-3β - ol - 20-one which may be oxidized to 16β-methylprogesterone. 16 - methyl-5,16 - pregnadien - 3β-ol-20-one may also be epoxidized by well-known procedures to the valuable 16β-methyl - 16α,17α - oxido derivative which, in turn, upon addition of hydrogen bromide will yield 16-methylene-17α-hydroxypregnenolone, a valuable precursor in the preparation of 16-methylene-17α - alkanoyloxy-progesterones and 16 - methylene-corticoids.

Heretofore, α-bromo-keto steroids and, in particular, 17-bromo steroids such as 16α - methyl - 17α - bromo-5-pregnen-3β-ol-20-one 3-acetate have been dehydrohalogenated to the corresponding α(β)-unsaturated keto steroid, e.g. 16 - dehydro - 20 - keto - steroids such as 16-methyl - 5,16 - pregnadien - 3β - ol - 20 - one 3-acetate by the action of the carbonates of alkali and alkali earth metals of groups IA and IIA of the periodic table either alone or coupled with lithium halide. Lithium carbonate and lithium bromide in dimethylformamide or dimethylacetamide is a well-known reagent mixture used for dehydrobrominations of α-bromo-keto steroids. By our invention, we have found that suspension of the oxides and/or hydroxides of magnesium, barium, strontium, calcium, and other alkaline earth metals of group IIA of the periodic table, in a solvent selected from the group consisting of N,N-dilower alkyl amides of hydrocarbon carboxylic acids and N-lower alkyl - 2 - pyrrolidones are excellent dehydrohalogenating agents and are particularly useful for dehydrohalogenating an α-bromo-keto steroid such as 16α - methyl - 17α - bromo - 5 - pregnen-3β-ol-20-one 3-acetate, whereby there is obtained the corresponding α(β)-unsaturated keto steroid, e.g. 16-methyl-5,16-pregnadien - 3β - ol - 17 - one 3-acetate, of high purity and in yields at least equal to the yields produced when utilizing prior art reagents such as the lithium carbonate/lithium bromide couple. The alkaline earth metal oxides and/or hydroxides of our invention are advantageously less expensive and more readily available than the prior art alkali metal carbonate/lithium bromide couple. Our novel process thus represents an improvement over known processes for dehydrohalogenating an α-bromo-keto steroid to an α(β)-unsaturated steroid.

Included among the α-bromo-keto steroids having a hydrogen on the carbon positioned beta to the keto group which are dehydrobrominated by our process are particularly those of the cholestane, spirostane, androstane, estrane and pregnane series, having α-bromo-keto systems such as the 2-bromo-1-keto-, 3-bromo-2-keto-, 2-bromo-3-keto-, 3-bromo-4-keto-, 4-bromo-3-keto-, 2,4-dibromo-3-keto-, 6-bromo-7-keto-, 7-bromo-6-keto-, 8-bromo-7-keto-, 9-bromo-11-keto-, 18-nor-12-bromo-11-keto-, 14-bromo-15-keto-, 16-bromo-17-keto-, and 17-bromo-20-keto systems which, upon dehydrobromination, will yield steroids having the corresponding α(β)-unsaturated-keto systems, i.e. the 2-dehydro-1-keto-, 3-dehydro-2-keto-, 1-dehydro-3-keto-, 2-dehydro-4-keto-, 4-dehydro-3-keto-, 1,4-bis-dehydro-3-keto-, 5-dehydro-7-keto-, 7-dehydro-6-keto-, 8- dehydro-7-keto-, 8-dehydro-11-keto-, 18-nor-12-dehydro-11-keto-, 8-dehydro-15-keto-, 15-dehydro-17-keto-, and 16-dehydro-20-keto- systems.

Thus, α-bromo-keto steroids of the cholestane series such as 1-keto-2α-bromocholestane,
2-keto-3α-bromocholestane,
3-keto-2,4-dibromocholestane,
3-keto-2-bromocholestane,
3β-acetoxy-7-keto-8β-bromocholestane,
3β-acetoxy-9α-bromo-11-keto-cholestane,
3β-acetoxy-5α-bromo-6-ketocholestane, and
3β-acetoxy-6-keto-7α-bromocholestane, upon treatment with an alkaline earth metal oxide and/or hydroxide, e.g. magnesium hydroxide and/or magnesium oxide (7:3) (with or without lithium bromide) in refluxing dimethylformamide, will undergo dehydrobromination to give α(β)-unsaturated-ketocholestanes known in the art, e.g.

1-keto-2-dehydrocholestane,
2-keto-3-dehydrocholestane,
3-keto-1,4-bis-dehydrocholestane,
3-keto-1-dehydrocholestane,
3β-acetoxy-7-keto-8-dehydrocholestane,
3β-acetoxy-11-keto-8-dehydrocholestane,
3β-acetoxy-6-keto-4-dehydrocholestane, and
3β-acetoxy-6-keto-7-dehydrocholestane, respectively.

Similarly, typical α-bromo-keto steroids of the spirostane, androstane, and estrane series which are dehydrobrominated by means of alkaline earth metal oxides and/or hydroxides in dimethylformamide to yield α(β)-unsaturated steroids known in the art, are spirostanes such as 11,23-dibromo-5α,22α-spirostan-12-one-3-ol 3-acetate
   (11,23-dibromo-hecogenin acetate),
2-bromo-5α,22α-spirostan-3-one,
2,4,23-tribromo-5α,22α-spirostan-3-one, which dehydrobrominate to yield 23-bromo-5α,22α-9(11)-spirosten-3β-ol-12-one 3-acetate,
5α,22α-1-spirosten-3-one, and
23-bromo-5α,22α-1,4-spirostadien-3-one, respectively; androstanes such as:

4,12-dibromo-3,11-diketo-17β-carbomethoxy-5β-
   androstane,
2α,4α-dibromo-3-keto-androstan-17β-ol,
2α-bromo-4α-methyl-androstan-17β-ol-3-one 17-acetate,
4-bromo-androstan-17β-ol-3-one, and
2,4-dibromo-androstane-3,17-dione, which upon dehydrobromination as outlined above, yields α(β)-unsaturated-keto steroids of the androstane series, e.g.

3,11-diketo-12-bromo-17β-carbomethoxy-4-androstene,
1,4-androstadien-17β-ol-3-one,
4α-methyl-1-androsten-17β-ol-3-one 17-acetate,
4-androsten-17β-ol-3-one (testosterone) and
1,4-androstadiene-3,17-dione, respectively;

and estranes such as 16-bromo-1,3,5(10)-estratrien-3-ol-17-one
   (16-bromoestrone);
4-bromo-19-nor-androstan-17β-ol-3-one;
4-bromo-19-nor-5β-androstane-3,17-dione;
4β-bromo-4α-methyl-19-nor-androstan-17β-ol-3-one
   17-acetate, which upon dehydrobromination yield 1,3,5(10),15-estratetraen-3-ol-17-one
   (15-dehydroestrone);
19-nor-4-androsten-17β-ol-3-one (19-nor-testosterone);
19-nor-4-androstene-3,17-dione, and
4α-methyl-19-nor-4-androsten-17β-ol-3-one 17-acetate
   (4α-methyl-19-nor-testosterone acetate), respectively.

Our process finds its greatest usefulness in dehydrobrominating α-bromo-keto-steroids of the pregnane series to obtain α(β)-unsaturated-keto steroids of the pregnane series which are useful as intermediates in preparing therapeutically valuable progestins and corticoids. Thus, for example, 2α-bromo-pregnane-3,11,20-trione,
2α-bromo-17α-acetoxy-pregnane-3,20-dione,
2,2-dibromo-5α-pregnan-3β-ol-20-one,
2,2-dibromo-16β-methyl-5α-pregnane-17α,21-diol-
   3,20-dione 21-acetate,
2,2-dibromo-16α-methyl-5α-pregnane-17α,21-diol-
   3,20-dione 21-acetate,
4α-bromo-17α-hydroxypregnane-3,20-dione,
4-bromopregnane-17α,21-diol-3,20-dione 21-acetate,
4β,17α-dibromopregnan-11β-ol-3,20-dione 11-acetate,
2α,4β-dibromopregnane-17α,21-diol-3,20-dione
   21-acetate,
2α,4β,21-tribromopregnane-3,20-dione,
2α,4β,17α,21-tetrabromopregnane-3,20-dione,
17α-bromo-5-pregnen-3β-ol-20-one 3-acetate
   (17α-bromopregnenolone acetate),
17β-bromo-17-iso-5-pregnen-3β-ol-20-one 3-acetate,
17α,21-dibromopregnan-3β-ol-20-one 3-acetate, and
17α-bromo-5β-pregnan-3β-ol-11,20-dione 3-acetate, upon treatment in refluxing dimethylformamide with a mixture of magnesium oxide and magnesium hydroxide (7:3) (with or without the presence of lithium bromide) yields the corresponding α,β-unsaturated keto steroid, all of which are known, useful compounds of the art: i.e.

1-pregnene-3,11,20-trione,
17α-acetoxy-1-pregnene-3,20-dione,
2-bromo-5α-1-pregnen-3β-ol-20-one,
2-bromo-16β-methyl-5α-1-pregnene-17α,21-diol-3,20-
   dione 21-acetate,
2-bromo-16α-methyl-5α-1-pregnene-17α,21-diol-3,20-
   dione 21-acetate,
17α-hydroxy-4-pregnene-3,20-dione (17α-hydroxyproges-
   terone),
4-pregnene-17α,21-diol-3,20-dione 21-acetate,
4,16-pregnadien-11β-ol-3,20-dione 11-acetate,
1,4-pregnadiene-17α,21-diol-3,20-dione 21-acetate,
21-bromo-1,4-pregnadiene-3,20-dione,
21-bromo-1,4,16-pregnatriene-3,20-dione,
5,16-pregnadien-3β-ol-20-one 3-acetate (16-dehydro-
   pregnenolone acetate),
5,16-pregnadien-3β-ol-20-one 3-acetate,
21-bromo-16-pregnen-3β-ol-20-one 3-acetate, and
5β-16-pregnen-3β-ol-11,20-dione 3-acetate, respectively.

As exemplified by some of the starting steroids appearing in the above lists, substituents other than the necessary α-bromo-keto moiety may be present in the molecule, such as free or esterified hydroxyl groups and free or substituted carbonyl groups. Fluorine is usually not affected under the conditions of our reaction; additionally, bromine atoms present in the steroidal molecule may remain untouched during our dehydrohalogenating process if there is no activating or reactive groups (e.g. a keto group) on the carbon alpha to the bromine bearing carbon and/or no available hydrogen on the carbon beta to the activating group. Thus, when dehydrohalogenating 2α,4β,21-tribromopregnane-17α-ol-3,11,20-trione with an excess of alkaline earth oxide and/or hydroxide, e.g. 6 moles of Sea Sorb 53 per mole of steroid in refluxing dimethylformamide, dehydrobromination occurs at C–2, and C–4, but not at C–21 (where there is no available β-hydrogen) and there is obtained 21-bromo-1,4-pregnadien-17α-ol-3,11,20-trione. In general, any α-bromo-keto steroid derivative having a hydrogen on the beta carbon will dehydrobrominate to an α(β)-unsaturated keto-steroid when heated with an alkaline earth oxide and/or hydroxide in a solvent selected from the group consisting of an N,N-dilower alkyl amide of a carboxylic acid and an N-lower alkyl 2-pyrrolidone. Thus, six-membered D-ring steroidal derivatives, e.g., 2α-methyl-2,4-dibromo-4,5-dihydro-allotestolactone, and 5-membered A-ring steroidal derivatives such as 1,3-dibromo-2-keto-A-nor spirostane upon treatment with magnesium oxide and/or hydroxide in refluxing dimethylformamide will dehydrobrominate to yield the corresponding α(β)-unsaturated keto steroid, i.e. 2-methyl-1-dehydro-testolactone and 1-bromo-2-keto-A-nor-3-spirostene, respectively.

In a preferred mode of this invention, a mixture of 16α-methyl-17α-bromo-5-pregnen-3β-ol-20-one 3-acetate (e.g. 16α-methyl-17α-bromopregnenolone acetate) and approximately a 70:30 mixture by weight of magnesium oxide and magnesium hydroxide (usually about 6.5 moles of reagent per mole of steroid is used) in dimethylformamide is heated at reflux temperature for 16 hours under an atmosphere of nitrogen. After filtering the inorganic salts, the dimethylformamide solution containing the 16-methyl-5,16-pregnadien-3β-ol-20-one 3-acetate (e.g. 16-methyl-16-dehydropregnenolone acetate) thereby formed is concentrated and treated with acetic anhydride and pyridine according to known procedures to reacetylate any hydrolyzed ester groups. The 16-methyl-5,16-pregnadien-3β-ol-20-one 3-acetate is then isolated by precipitation in a mineral acid-water medium whereby is obtained almost a theoretical yield of 16-methyl-16-dehydropregnenolone acetate (M.P. 160° C.) which upon recrystallization from methanol yields pure 16-methyl-5,16-pregnadien-3β-ol-20-one 3-acetate (M.P. 170° C.).

For complete dehydrobromination, there is used at least a half mole (one equivalent weight) of alkaline earth metal oxide or hydroxide, or mixture thereof per mole of bromide to be dehydrobrominated. By this we mean that if the steroid to be dehydrohalogenated possesses but one α-bromo-keto function having a β-hydrogen, such as in 17α-bromo-5-pregnen-3β-ol-20-one, the theoretical quantity of alkaline earth oxide and/or hydroxide needed to completely dehydrobrominate a mole of said steroid would be a half mole (which is one equivalent weight); whereas, to completely dehydrobrominate a mole of steroid possessing two α-bromo-keto functions having available β-hydrogens, e.g. 2,4-dibromo-16β-methyl-5α-pregnane-17α,21-diol - 3,20 - dione, there should be used at least a mole (i.e. two equivalents) of said alkaline earth oxide and/or hydroxide.

We find it convenient when practicing our invention to use a substantial excess of alkaline earth metal oxide and/or hydroxide, and usually use about 6 to 7 moles of reagent per mole of α-bromo-keto steroid being dehydrobrominated.

Our process is carried out at temperatures in the range of 50–165° C., usually between about 100 and 165° C. and preferably at the reflux temperature of N,N-dimethylformamide, which is about 153° C.

The time required for complete dehydrobromination is dependent upon the temperature of the reaction mixture and upon the particular alkaline earth base used. It is therefore desirable to monitor the reaction by obtaining ultraviolet absorption or thin layer chromatographic data on aliquots of the reaction mixture at given intervals until there is no further evidence of any starting bromo-steroid.

A lithium halide, e.g. lithium bromide may be used in conjunction with the alkaline earth oxide and/or hydroxide reagent in which case the dehydrobromination reaction will usually proceed at a faster rate. For example, if about an equimolar weight of lithium bromide per mole of steroid is added to the Sea Sorb 53 reagent mixture when dehydrobrominating 16α-methyl-17α-bromo-5-pregnen-3β-ol-17-one 3-acetate as described hereinabove, the dehydrobrominating time will be shortened to less than half the original reaction time.

When dehydrohalogenating a steroid containing an ester group such as in 16α-methyl-17α-bromopregnenolone acetate according to our process, there may occur some hydrolysis of the ester function. The hydrolysis is usually less than 10% when the oxides or hydroxides of magnesium and calcium are used, but approaches completion when the oxides or hydroxides of strontium or barium are employed. When the product desired is an ester, acylation of the resulting product before isolation and purification thereof will yield the desired product. When a hydroxy compound is desired, use of strontium or barium oxides and/or hydroxides as dehydrobrominating agent is preferable.

We have described in detail the dehydrobromination of 16α-methyl-17α-bromopregnenolone acetate to obtain 16-methyl-16-dehydropregnenolone acetate. An isomer of the foregoing, i.e. 16α-methyl-17β-bromo-17-iso-pregnenolone acetate, or mixtures thereof with 16α-methyl-17α-bromopregnenolone acetate are also dehydrobrominated by means of alkaline earth oxides and/or hydroxides to obtain 16-methyl-16-dehydropregnenolone or the acetate thereof.

Additionally, by our process, there is conveniently effected the dehydrobromination of 2,4-dibromo-16β-methyl-5α-pregnane-17α,21-diol-3,20-dione 21-acetate to the corresponding α,β-unsaturated keto steroid, e.g. 16β-methyl-1,4-pregnadiene-17α,21-diol - 3,20 - dione 21-acetate, a known, valuable intermediate in the preparation of therapeutically valuable 11-oxygenated-16β-methyl-1,4-pregnadienes. Thus, treatment of 2,4-dibromo-16β-methyl-5α-pregnane-17α,21-diol-3,20-dione 21-acetate with usually 8 molar excess of Sea Sorb 53 (to which lithium bromide may be added) under nitrogen at 100° C. for 24 hours according to our process, yields the resulting dehydrobrominated product, i.e. 16β-methyl-1,4-pregnadiene-17α, 21-diol-3,20-dione 21-acetate into which can be introduced an 11α-hydroxyl function by means of a micro-organism of the genus Glomerella (e.g. *Glomerella cingulata*, ATCC 10534) according to known procedures. The 11α-hydroxy intermediate thereby formed, i.e. 16β-methyl-1,4-pregnadiene-11α,17α,21-triol-3,20-dione, can be readily converted to the corresponding 11β-hydroxy or 11-keto-analogs which are therapeutically active anti-inflammatory compounds useful in the treatment of arthritis and like diseases.

The best mode contemplated by the inventors for carrying out their invention will now be set forth as follows. It is to be understood that the examples are merely illustrative of the process of this invention and are not to be construed as limiting the invention.

EXAMPLE 1

*Dehydrobromination of 16α-methyl-17α-bromopregnenolone acetate utilizing a magnesium oxide/magnesium hydroxide mixture*

(A) Prepare an anhydrous mixture of 40 g. of 16α-methyl-17α-bromopregnenolone acetate in 800 ml. of dimethylformamide and 27.4 g. of Sea Sorb No. 53 (a mixture of about 70% magnesium oxide and 30% magnesium hydroxide). Heat the reaction mixture at reflux temperature (150–155° C.) in a nitrogen atmosphere for 16 hours. Cool the reaction mixture to 40° C. and filter. Distill the filtrate in vacuo to a concentrated solution having a volume of about 270 ml. comprising 16-methyl-16-dehydropregnenolone acetate together with a small amount (usually at most 5% total weight) of the corresponding 3-hydroxy analog thereof in dimethylformamide.

(B) Add 800 ml. of dry pyridine and 40 ml. of acetic anhydride to the concentrated dimethylformamide solution of Example 1A and stir the reaction mixture at 90° C. for two hours. Cool to 40–50° C. and pour into 8 liters of 10% aqueous hydrochloric acid with vigorous stirring. When the pH of the mixture is above 0.8, add concentrated hydrochloric acid dropwise until the mixture is at pH=0.8 or below. Filter the resultant precipitate, wash with water, and dry at 60° C. to obtain substantially 16-methyl-16-dehydropregnenolone acetate. M.P. 160° C.; $\lambda_{max.}^{CH_3OH}$ 250–251 m$\mu$ ($\epsilon$=7900); yield=32 g.

Purify by crystallization from methanol after first clarifying the methanol solution by means of activated carbon to yield 16-methyl-16-dehydropregnenolone acetate. M.P. 170° C.; $[\alpha]_D^{25}$=−80° (1% dioxane); $\lambda_{max.}$ 250–251 m$\mu$ ($\epsilon$=8600). Yield=25.4 g. (77.2% theory).

Similarly, in the manner described hereinabove, treat an anhydrous mixture of 16$\alpha$-methyl-17$\alpha$-bromopregnenolone acetate and from 5 to 10% (by weight) of the corresponding 17$\beta$-bromo-17-iso derivative, i.e. 16$\alpha$-methyl-17$\beta$-bromo-17-isopregnenolone 3 - acetate (mixture prepared as in Preparation I) with Sea Sorb 53 in dimethylformamide. Isolate the resultant product in the described manner, then reacetylate to esterify any 3-hydroxy group which may be present to obtain 16-methyl-16-dehydropregnenolone acetate.

EXAMPLE 2

*Dehydrobromination utilizing a magnesium oxide/magnesium hydroxide mixture and lithium bromide*

(A) Prepare an anhydrous mixture of 10.5 g. of 16$\alpha$-methyl-17$\alpha$-bromopregnenolone acetate, 10.6 g. of lithium bromide, 210 ml. of dimethylformamide, and 7.17 g. of Sea Sorb No. 53. Heat at reflux temperature (150–155° C.) for six hours under an atmosphere of nitrogen. Cool the reaction mixture to 40° C., filter, and distill the filtrate in vacuo to a concentrated solution (about 70 ml.) comprising 16-methyl-16-dehydropregnenolone 3-acetate in admixture with a small amount (usually at most 5% by weight) of the corresponding 3-hydroxy analog thereof in dimethylformamide.

(B) Reacetylate by adding 21 ml. of pyridine and 10.5 ml. of acetic anhydride to the concentrated solution and stirring the mixture at 90° C. for two hours. Cool the mixture to 40–50° C. and isolate the resultant 3-acetate in the manner described in Example 1B to obtain substantially 16-methyl-16-dehydropregnenolone acetate. M.P. 160–161° C.; $[\alpha]_D^{25}$ −77.3° (1% dioxane); $\lambda_{max.}^{CH_3OH}$ 250–25 m$\mu$ ($\epsilon$=7550); yield=8.4 g. (80% theory).

Purify by crystallization from methanol to give 16-methyl-16-dehydropregnenolone acetate. M.P. 172–174° C. $[\alpha]_D^{25}$=−80.3° (1% dioxane); $\lambda_{max.}^{CH_3OH}$ 250–251 m$\mu$ ($\epsilon$=8900); yield=6.3 g. (73% theory).

EXAMPLE 3

In each of the following examples, 1 g. of 16$\alpha$-methyl-17$\alpha$-bromopregnenolone acetate in dimethylformamide is dehydrobrominated in the manner similar to that described in Example 1A, except there is utilized in place of Sea Sorb No. 53 the reagent listed in the chart below. In each example listed below, the reaction mixture is heated for the time indicated, then cooled, filtered, and concentrated in vacuo to a residue comprising a product mixture whose components are determined by thin layer chromatography utilizing a benzene/methanol solvent system (99:1, v./v., i.e. by taking the chromatogram of 5$\gamma$ of a 5% solution of the product.

In each of the following examples, reacetylation of the product mixture obtained and purification thereof according to the procedure of Example 1B yields 16-dehydropregnenolone acetate. In those examples wherein the product comprises 16-dehydropregnenolone acetate, the reacetylation procedure may be omitted.

All melting points are taken on a Kofler Hot Bench, and all rotations taken were of a 1% dioxane solution.

| Reagent | Reaction Time and Temperature | Yield and Properties of Crude Product Prior to Reacetylation |
|---|---|---|
| (A) Strontium oxide, 1.77 g. | 17 hrs.=100° C. | M.P. 224–228° C.; $[\alpha]_D^{25}$=−79.4°; $\lambda_{max.}^{CH_3OH}$ 250–251 m$\mu$. Yield=0.65 g. comprising 16-methyl-16-dehydropregnenolone. |
| (B) Barium oxide, 2.61 g. | 17 hrs.=100° C. | M.P. 136–146° C.; $[\alpha]_D^{25}$=−71.6°; $\lambda_{max.}^{CH_3OH}$ 250–251 m$\mu$. Yield=0.72 g. comprising 16-methyl-16-dehydropregnenolone acetate, together with a small amount of 16-methyl-16-dehydropregnenolone. |
| (C) Barium hydroxide, 2.91 g. | 16 hrs.=100° C. | M.P. 170–180° C.; $[\alpha]_D^{25}$=−73.6°; $\lambda_{max.}^{CH_3OH}$ 250–251 m$\mu$. Yield=0.75 g. comprising 16-methyl-16-dehydropregnenolone. |
| (D) Strontium hydroxide, 2.07 g. | 16 hrs.=100° C. | M.P. 190–205° C.; $[\alpha]_D^{25}$=−87.3°; $\lambda_{max.}^{CH_3OH}$ 250–251 m$\mu$. Yield=0.65 g. comprising 16-methyl-16-dehydropregnenolone. |
| (E) Magnesium oxide, 0.685 g. | 6 hrs. at reflux (150–155° C.) | M.P. 158–166° C.; $[\alpha]_D^{25}$=−75°; $\lambda_{max.}^{CH_3OH}$ 250–251 m$\mu$. Yield=0.803 g. comprising 16-methyl-16-dehydropregnenolone acetate with trace amounts of 16-methyl-16-dehydropregnenolone. |
| (F) Magnesium oxide, 0.685 g. | 16 hrs.=100° C. | M.P. 150–158° C.; $[\alpha]_D^{25}$=−67.9°; $\lambda_{max.}^{CH_3OH}$ 250–251 m$\mu$. Yield=0.69 g. comprising 16-methyl-16-dehydropregnenolone acetate with trace quantities of 16-methyl-16-dehydropregnenolone. |
| (G) Magnesium hydroxide, 0.992 g. | 16 hrs.=100° C. | M.P. 156–160° C.; $[\alpha]_D^{25}$=−61°; $\lambda_{max.}^{CH_3OH}$ 250–251 m$\mu$. Yield=0.75 g. comprising 16-methyl-16-dehydropregnenolone acetate. |
| (H) Magnesium oxide/magnesium hydroxide (7:3, w./w.), Sea Sorb 53, 0.684 g. | 6 hrs. at reflux (150–155° C.) | M.P. 153° C.; $[\alpha]_D^{25}$=−64°; $\lambda_{max.}^{CH_3OH}$ 250–251 m$\mu$. Yield=0.78 g. comprising 16-methyl-16-dehydropregnenolone acetate. |
| (I) Magnesium oxide/magnesium hydroxide (7:3, w./w.), Sea Sorb 53, 0.684 g. | 16 hrs.=100° C. | M.P. 154–160° C.; $[\alpha]_D^{25}$=−58°; $\lambda_{max.}^{CH_3OH}$ 250–251 m$\mu$. Yield=0.88 g. comprising 16-methyl-16-dehydropregnenolone acetate. |
| (J) Calcium oxide, 0.952 g. | 15 hrs.=100° C. | M.P. 96–100° C.; $[\alpha]_D^{25}$=−76°; $\lambda_{max.}^{CH_3OH}$ 250–251 m$\mu$. Yield=0.55 g. comprising a mixture of 16-methyl-16-dehydropregnenolone and acetate thereof, together with a polar impurity. |
| (K) Calcium oxide, 0.952 g. | 6 hrs. at reflux (150–155° C.) | M.P. 168–174° C.; $[\alpha]_D^{25}$=−79.9°; $\lambda_{max.}^{CH_3OH}$ 250–251 m$\mu$. Yield=0.684 g. comprising 16-methyl-16-dehydropregnenolone. |

| Reagent | Reaction Time and Temperature | Yield and Properties of Crude Product Prior to Reacetylation |
| --- | --- | --- |
| (L) Calcium hydroxide, 1.26 g | 16 hrs.=100° C | M.P. 95–115° C.; $[\alpha]_D^{25}=-75°$; $\lambda_{max.}$ 250–251 mµ. Yield=0.65 g. comprising a product mixture comprising 16-methyl-16-dehydropregnenolone and the 3-acetate ester thereof together with a polar impurity. |
| (M) Calcium hydroxide, 1.26 g | 6 hrs. at reflux (150–155° C.) | M.P. 170–180° C.; $[\alpha]_D^{25}=-70.4°$; $\lambda_{max.}$ 250–251 mµ. Yield=0.71 g. comprising 16-methyl-16-dehydropregnenolone. |

EXAMPLE 4

*Dehydrobromination of 2,4-dibromo-16β-methyl-5α-pregnane-17α,21-diol-3,20-dione 21-acetate utilizing a magnesium oxide/magnesium hydroxide mixture*

To an anhydrous mixture of 1.8 g. of Sea Sorb No. 53 and 1 g. of lithium bromide in 30 ml. of dimethylformamide at 100° C., add 1 g. of 2,4-dibromo-16β-methyl-5α-pregnane-17α,21-diol-3,20-dione 21-acetate over a 30-minute period with stirring. Stir the reaction mixture under a blanket of nitrogen for about 20 hours at 100° C. Cool the reaction mixture to 30° C. Filter, and concentrate the filtrate in vacuo to a residue of about 10 ml. Pour the residue into dilute hydrochloric acid (1.2 ml. of concentrated hydrochloric acid to 200 ml. of water). Filter and wash to neutrality with water with the resultant precipitate comprising 16β-methyl-1,4-pregnadiene-17α,21-diol-3,20-dione 21-acetate.

EXAMPLE 5

*Dehydrobromination of 2,4-dibromo-16β-methyl-5α-pregnane-17α,21-diol-3,20-dione 21-acetate using magnesium oxide*

Treat 2,4-dibromo-16β-methyl-5α-pregnane-17α,21-diol-3,20-dione 21-acetate in a manner similar to that described in Example 4 using powdered magnesium oxide instead of Sea Sorb No. 53, and there is obtained 16β-methyl-1,4-pregnadiene-17α,21-diol-3,20-dione 21-acetate.

Alternatively, treat 2,4-dibromo-16β-methyl-5α-pregnane-17α,21-diol-3,20-dione 21-acetate with magnesium oxide in the manner described above with the exception that the reaction mixture is kept at 105° C. rather than 100° C., whereby complete dehydrobromination is achieved after four hours. Isolate the resultant product in the manner similar to that described in Example 4 to obtain 16β-methyl-1,4-pregnadiene-17α,21-diol-3,20-dione 21-acetate.

PREPARATION I

*Preparation of 16α-methyl-17α-bromopregnenolone acetate in admixture with 16α-methyl-17β-bromo-17-iso-pregnenolone acetate from 16-dehydropregnenolone acetate*

(A) *Grignard reaction to form 3β-acetoxy-16α-methyl-5,17(20)-pregnadien-20-ol 20-magnesium bromide salt.—* To a solution of 35.65 g. (0.10 mole) of 16-dehydropregnenolone acetate in 356.5 ml. of dry tetrahydrofuran, add 1.1 g. of cuprous chloride (0.011 mole), and cool the mixture to 0–5° C. Vigorously stir this cooled solution under a blanket of nitrogen and add dropwise a 0.5 N. solution of methyl magnesium bromide in dry tetrahydrofuran until slightly less than 0.10 mole of the Grignard reagent is added; continue the addition of Grignard reagent and determine the ultraviolet absorption at 237 mµ (conjugated Δ16-20-carbonyl) of samples removed from the reaction mixture. When the absorption at 237 mµ becomes negligible, discontinue addition of the methyl magnesium bromide solution. Add the methyl magnesium bromide solution at such a rate so as to maintain the reaction temperature between 0 and 5° C. Normally within 15 to 20 minutes, the addition is complete, and there is formed 3β-acetoxy-16α-methyl-5,17(20)-pregnadien-20-ol 20-magnesium bromide salt in tetrahydrofuran.

(B) *In situ bromination of the 20-magnesium bromide enolate.—*Continue to vigorously agitate the reaction mixture of Preparation 1A containing 3β-acetoxy-16α-methyl-5,17(20)-pregnadien-20-ol 20-magnesium bromide salt in tetrahydrofuran under a blanket of nitrogen and add over a 10 to 15 minute period about 14 g. of dry bromine at such a rate as to maintain the reaction temperature at 0–5° C. Then continue cautious addition of small quantities of bromine until a total of about 0.10 mole of bromine has been added as determined by obtaining a positive test of the reaction mixture with starch-iodide test paper. Pour the reaction mixture into 10 liters of distilled water, and collect the precipitate thereby formed by filtration, and wash with water and dry to obtain substantially 16α-methyl-17α-bromopregnenolone acetate in admixture with a small quantity (usually about 5%) of 16α-methyl-17β-bromo-iso-pregnenolone acetate. Yield= 47 g.

This product may be used without further purification for dehydrohalogenation according to the procedure of Example 1 to produce 16-methyl-16-dehydropregnenolone acetate.

We claim:

1. In the process wherein an α-bromo-keto-steroid having a hydrogen on the beta carbon is treated with a dehydrohalogenating agent and there is formed an α(β)-unsaturated-keto-steroid, the improvement which comprises treating said α-bromo-keto-steroid with a dehydrohalogenating agent selected from the group consisting of an alkaline earth oxide, an alkaline earth hydroxide, and mixtures thereof, in a solvent selected from the group consisting of an N-lower alkyl 2-pyrrolidone and an N,N-dilower alkyl amide of a hydrocarbon carboxylic acid having up to 18 carbon atoms.

2. The process of claim 1 when carried out at temperatures in the range of from about 100° to about 165° C. and wherein said α-bromo-keto steroid is a 17-bromo-20-keto-steroid of the pregnane series and wherein said α(β)-unsaturated-keto-steroid thereby formed is a 16-dehydro-20-keto-steroid of the pregnane series.

3. The process of claim 2 wherein the dehydrohalogenating agent is a mixture of about 70% magnesium oxide and about 30% magnesium hydroxide by weight.

4. The process of claim 2 wherein the solvent is an N,N-dilower alkyl amide of a hydrocarbon carboxylic acid having up to 18 carbon atoms.

5. The process of claim 2 wherein the solvent is dimethylformamide.

6. The process of claim 2 wherein the dehydrohalogenating agent is a mixture of about 70% magnesium oxide and about 30% magnesium hydroxide by weight and wherein the solvent is refluxing dimethylformamide.

7. The process of claim 2 wherein said α-bromo-20-keto-steroid is 16α-methyl-17α-bromo-5-pregnen-3β-ol-20-one 3-acetate, wherein the dehydrohalogenating agent is a mixture of about 70% magnesium oxide and about 30% magnesium hydroxide by weight, wherein the solvent is refluxing dimethylformamide, and wherein said 16-dehydro-20-keto steroid thereby produced is 16-methyl-5,16-pregnadien-3β-ol-20-one 3-acetate.

8. The process of claim 1 wherein said α-bromo-ketosteroid is a 17-bromo-20-keto-steroid of the pregnane series and wherein said α(β)-unsaturated steroid thereby formed is a 16-dehydro-20-keto steroid of the pregnane series, when carried out at temperatures in the range of from about 100° C. to about 165° C. and wherein lithium bromide is added to said dehydrohalogenating agent.

9. The process of claim 8 wherein the dehydrohalogenating agent is a mixture of about 70% magnesium oxide and about 30% magnesium hydroxide by weight, together with lithium bromide, and wherein the solvent is refluxing dimethylformamide.

10. The process of claim 8 wherein said 17-bromo-20-keto steroid is 16α-methyl-17α-bromo-5-pregnen-3β-ol 3-acetate and the dehydrohalogenating agent is a mixture of about 70% magnesium oxide and about 30% magnesium hydroxide by weight, together with lithium bromide, and the solvent is refluxing dimethylformamide, said 16-dehydro-20-keto-steroid thereby formed being 16-methyl-5,16-pregnadien-3β-ol-20-one 3-acetate.

References Cited

UNITED STATES PATENTS 3,018,285  1/1962  Ringold et al. ____ 260—239.55

OTHER REFERENCES

Holysz: J. Amer. Chem. Soc., 75. 4432–4437 (1953).

LEWIS GOTTS, Primary Examiner.

T. M. MESHBESHER, Assistant Examiner.